(No Model.) 2 Sheets—Sheet 1.

E. WESTON.
ELECTRICAL MEASURING INSTRUMENT.

No. 452,326. Patented May 12, 1891.

WITNESSES:
Gustave Dieterich
Augustus Dieterich

INVENTOR
Edward Weston
BY
Carb Benjamin
his ATTORNEY.

(No Model.) 2 Sheets—Sheet 2.
E. WESTON.
ELECTRICAL MEASURING INSTRUMENT.
No. 452,326. Patented May 12, 1891.
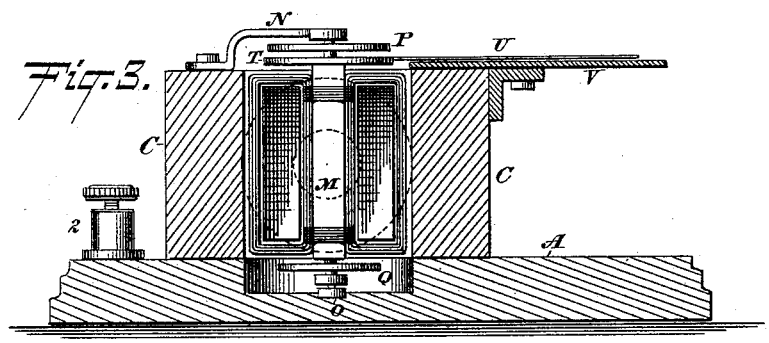
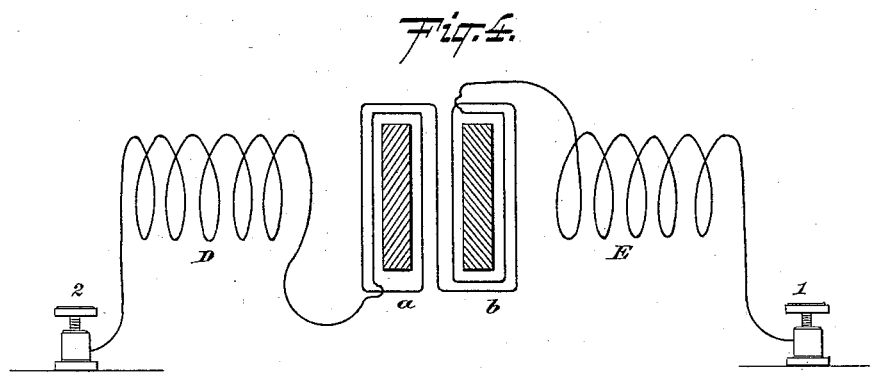
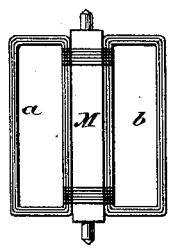
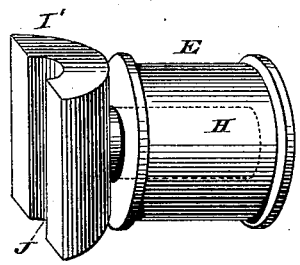
WITNESSES:
Gustave Dieterich
Augustus Dieterich
INVENTOR
Edward Weston
BY Park Benjamin
ATTORNEY.

UNITED STATES PATENT OFFICE.

EDWARD WESTON, OF NEWARK, NEW JERSEY.

ELECTRICAL MEASURING-INSTRUMENT.

SPECIFICATION forming part of Letters Patent No. 452,326, dated May 12, 1891.

Application filed July 8, 1890. Serial No. 358,069. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention relates to an electrical instrument for measuring difference in potential existing between its terminals; and it consists, broadly, in a coil rotary on a diametral axis and a magnet, said coil being in the field of force of the magnet and disposed between its poles, and also in the construction set forth, whereby the frame which supports the electro-magnets, their cores, and the pole-pieces constitute a single magnetic structure.

Figure 1:
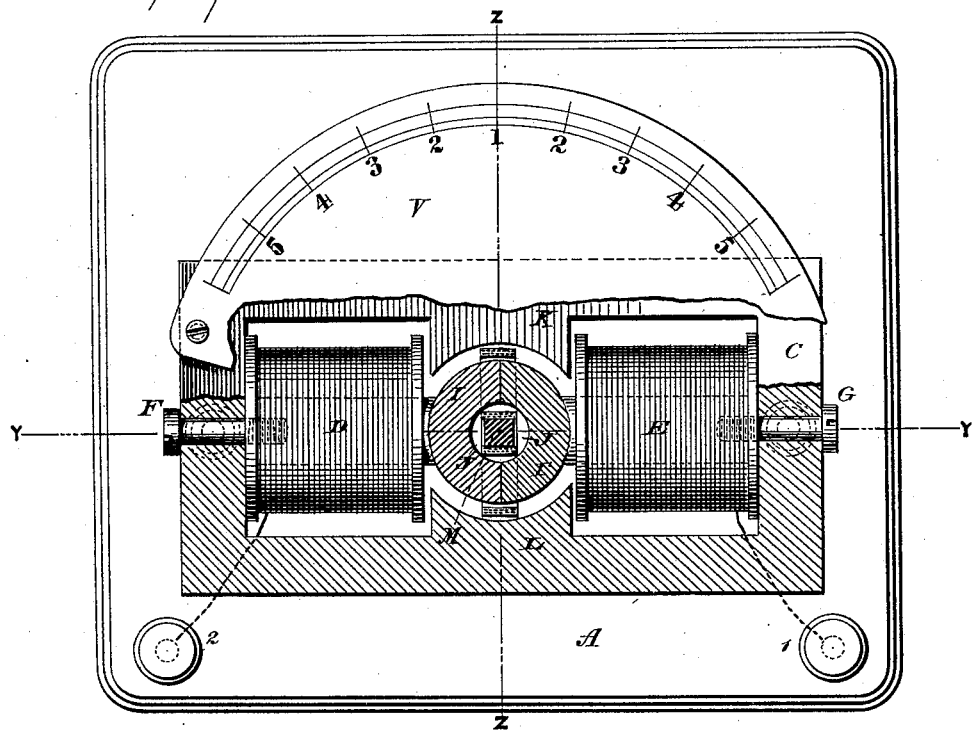
Figure 2:
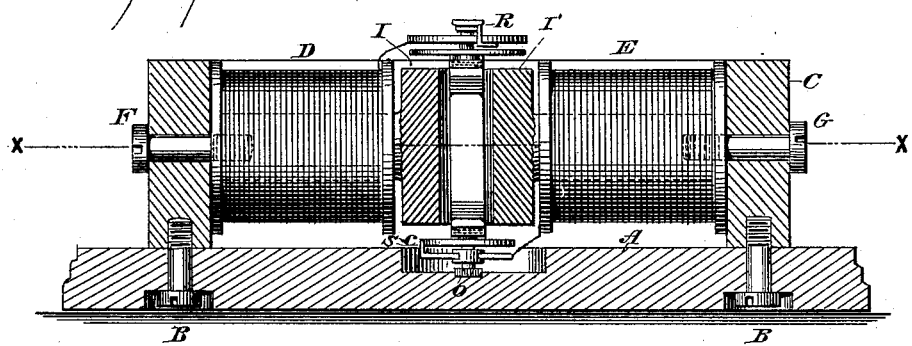

In the accompanying drawings, Figure 1 is a plan view and partial horizontal section of the instrument on the line X X of Fig. 2. Fig. 2 is a section on the line Y Y of Fig. 1. Fig. 3 is a section on the line Z Z of Fig. 1. Fig. 4 is a diagram showing the circuit in the apparatus. Fig. 5 shows the movable coils and pivots separately. Fig. 6 shows one electro-magnet and its core, said core carrying one-half of the internal cylinder.

Similar letters and figures of reference indicate like parts.

A is the base-board of the instrument, to which is secured by screws B the rectangular frame C of magnetic material.

D and E are two electro-magnets disposed in said frame and secured thereto by screws F and G, entering their cores H. At the extremities of the magnet-cores H, respectively, are half-cylinders I and I', each having a longitudinal groove J. When the magnets D and E are secured in place in the frame C, the plane faces of the half-cylinders I I' meet to form a complete cylinder. On the inner side of the frame C are two projections K L, which have inner semicircular faces concentric with the outer face of the cylinder I I'.

It will be obvious from the above that the cylinder I I', cores D E, and frame C constitute a complete magnetic structure, in which the cylinder I I' is one pole and the projections K L the other pole. Passing through the central opening in the cylinder I I' is a squared shaft M, having its ends pivoted, respectively, in an arm N and in a step-bearing O, Fig. 3. Surrounding the ends of the shaft M are coiled springs P Q, said springs each having one end attached to the shaft M and the other end to the movable arm R or S, said arm being pivoted and rotating on shaft M. By turning the arms R or S the coiled springs P and Q may be tightened or loosened, as desired. The object of said springs is to oppose the rotary motion of the pivot-shaft M. Also on the pivot-shaft M is a disk T, which carries an index-needle U, which needle U extends over a scale-plate V. *a* and *b* are two light frames of paper or other non-magnetic material, upon which are wound a coil of fine insulated wire, the direction of winding, as shown in Fig. 4, being the same on both frames. The said frames *a* and *b* are lashed or otherwise secured in any suitable way to the sides of the squared pivot-shaft M, and they receive within them the annular cylinder I I'. It will be obvious that the outer parts of each coil *a* or *b* move in the intense magnetic field between the cylinder I I' and the pole-pieces K L, and that inasmuch as both coils are wound in the same direction the resulting rotative effect of the field set up in the coils by the passage of a current through them reacting upon the magnetic field is in like direction for each coil, and hence when a current is established in the apparatus the effect of the two coils is to rotate the pivot-shaft M to an extent or over an angular distance dependent upon the difference of potential existing between the terminals of the instrument.

The circuit in the instrument, as shown in Fig. 4, proceeds from binding-post 1, through electro-magnet E, through coil *b*, through coil *a*, electro-magnet D, to binding-post 2. The scale V may be marked in any suitable manner to indicate electrical pressure or electrical strength.

The instrument may be use as a voltmeter, arranged as here shown, or as an ammeter by making the coils on the electro-magnets D E of thick wire and arranging the movable coils *a b* in shunt. The object of dividing the cylinder I I' is to enable the parts of the instrument to be more conveniently put together.

I claim—

1. In an electrical measuring-instrument, a magnet having one pole in annular form and the other pole concave, with its surface in proximity to the periphery of said annular pole, a rotary shaft or pivot extending through said annular pole, and a coil supported by said shaft and extending between said poles.

2. In an electrical measuring-instrument, a magnet having one pole in annular form and the other pole concave, with its surface in proximity to the periphery of said annular pole, a rotary shaft or pivot extending through said annular pole, and two coils similarly wound supported by said shaft and extending between said poles.

3. In an electrical measuring-instrument, an electro-magnet having its poles in proximity, and a rotary coil pivoted on a diametral axis and extending through the space between said poles, said coil and magnet being electrically connected.

4. In an electrical measuring-instrument, an electro-magnet having its poles in proximity, and a rotary coil pivoted on a diametral axis and extending through the space between said poles, said coil and magnet being electrically connected, and means for indicating the movement of said coil.

5. In an electrical measuring-instrument, an electro-magnet having its poles disposed so that there is an annular space between them, and a rotary coil pivoted on a diametral axis and extending through said annular space, said coil and magnet being electrically connected.

6. In an electrical measuring-instrument, an electro-magnet having one pole in annular form and its other pole concave, with its surface in proximity to said annular pole, and a rotary coil extending between said pole and through said annular pole, said coil and magnet being electrically connected.

7. In an electrical measuring-instrument, two electro-magnets having their longitudinal axes in prolongation and common to both, an annular pole, and a concave pole having its surface in proximity to said annular pole, in combination with a coil extending between said poles and through said annular pole, said coil and magnets being electrically connected.

8. In an electrical measuring-instrument, the combination of the magnets D E, having the pole-pieces I I', the frame C, having polar projections K L, and the rotary coils $a\,b$, the said pole-pieces I I' meeting to form an annular pole-piece concentric with the concave inner faces of said polar projections K L and the coils $a\,b$ passing through the opening in and surrounding said annular pole-piece.

9. In an electrical measuring-instrument, the combination of the magnets D E, having the pole-pieces I I', the frame C, having polar projections K L, means, as screws G, for detachably connecting said magnets and said frame, and rotary coils $a\,b$, the said pole-pieces I I' meeting to form an annular pole-piece concentric with the concave inner faces of said polar projections K L and the coils $a\,b$ passing through the opening in and surrounding said annular pole-piece.

10. In an electrical measuring-instrument, the combination of the magnets D E, having the pole-pieces I I', the frame C, having polar projections K L, the rotary pivot-shaft M, and coils $a\,b$, supported on said shaft, the said pole-pieces I I' meeting to form an annular pole-piece concentric with the concave inner faces of said polar projections K L and the coils $a\,b$ being supported on said pivot-shaft M and passing through the opening in and surrounding said annular pole-piece.

11. In an electrical measuring-instrument, the combination of the magnets D E, having the pole-pieces I I', the frame C, having polar projections K L, rotary coils $a\,b$, index U, moved by said coils, and scale V, the said pole-pieces I I' meeting to form an annular pole-piece concentric with the concave inner faces of said polar projections K L and the coils $a\,b$ passing through the opening in and surrounding said annular pole-piece.

EDWARD WESTON.

Witnesses:
  K. W. ELY,
  R. C. FESSENDEN.